May 28, 1968 A. R. GELLER 3,385,980

LATCHING CIRCUIT HAVING MINIMAL OPERATIONAL DELAY

Filed Oct. 27, 1967

INVENTOR
ALAN R. GELLER

BY Edward S. Gershuny

AGENT

United States Patent Office 3,385,980
Patented May 28, 1968

3,385,980

LATCHING CIRCUIT HAVING MINIMAL OPERATIONAL DELAY

Alan R. Geller, Poughkeepsie, N.Y., assignor to International Business Machines Corporation, Armonk, N.Y., a corporation of New York Continuation-in-part of application Ser. No. 445,309, Apr. 5, 1965. This application Oct. 27, 1967, Ser. No. 678,705
3 Claims. (Cl. 307—289)

ABSTRACT OF THE DISCLOSURE

In a large-scale data processing system having multistage registers, there is disclosed a typical stage comprising a plurality of logical circuits.

Figure 1:
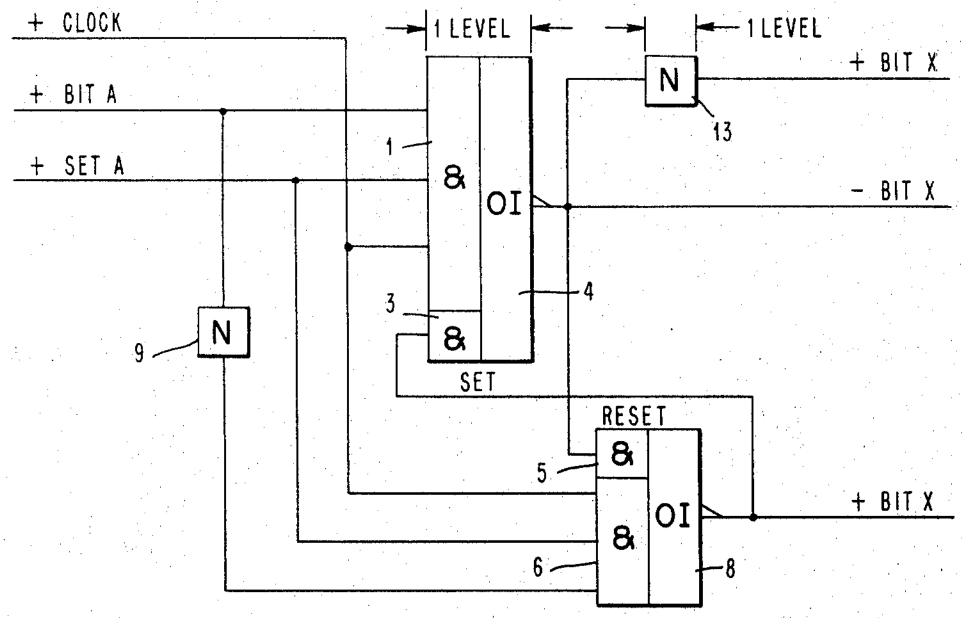

This application is a continuation-in-part of co-pending application Ser. No. 445,309, filed Apr. 5, 1965 now abandoned.

This invention relates to a logical register stage having a minimum time delay for setting either to the one or zero state without regard to whether it was previously set to a one or a zero.

In the prior art, the establishment of triggers and latches and other bistable devices useful in register stages by means of AND circuits and OR circuits connected in a feed-back relationship, is well known. However, in these configurations, resetting of the bistable device has been required whenever a combination of inputs in needed. Furthermore, when the full logical arrangement of the input control circuits is provided, three or four "levels" of logic delay time are required in prior art devices in order to sample the output whether the latch is set to a one, or to a zero, it not being possible to assume that the latch, or register stage, was previously set in a known condition.

Accordingly, object of the present invention is to provide a quick-setting register stage.

Another object is the provision of a register stage having a minimum time delay in reflecting an input condition thereto at the output thereof.

A further object is provision of a bistable register means which, without independent reset control, can reflect zeros or ones equally well, without knowing the previous state or condition, of said register means.

The present invention provdies two logical stages in feed-back relationship. In a particular embodiment thereof, two AND-OR-INVERT devices are connected in feed-back relationship so as to provide a set side and a reset side of a bistable register means. This permits connecting to said register means as necessary so that fast responses for setting to ones or to zeros can be achieved where critical data path timing is involved.

A utilization of the present invention is illustrated in a application of the same assignee, entitled Large Scale Data Processing System, Ser. No. 445,326, filed Apr. 5, 1965, now abandoned, and a continuation-in-part application thereof filed Jan. 13, 1967, Ser. No. 609,238.

Figure 2:
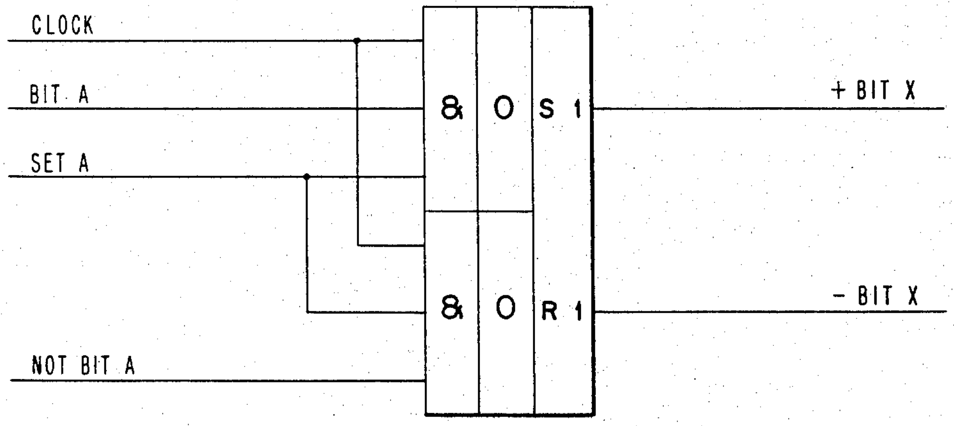

Other objects, features and advantages of the present invention will become more apparent in the light of the detailed description of a particular embodiment thereof, as set forth in the drawings, wherein:

FIG. 1 is a schematic diagram of a quick set latch in accordance with the present invention; and FIG. 2 is a simplified representation of said latch as it appears in said copending application.

Referring to FIG. 1, a plurality of AND circuits 1 and 3 feed and OR invert circuit 4, the output of which is applied to an AND circuit 5, which along with AND circuit 6 feeds and OR invert circuit 8. The output of the OR invert circuit 8 is applied to the AND circuit 3. Thus, when the AND circuit 1 is enabled, there will be a negative output from the the OR invert circuit 4 so as to provide a minus bit X signal, this minus output inhibiting the action of the single input AND circuit 5. There will be no operation of the OR invert circuit 8 because AND circuits 5 and 6 are both disabled. When the OR invert circuit 8 quiescent, it has a positive output, generating a plus bit X signal. This bit X signal is fed back through the single input AND circuit 3 so as to cause the OR invert 4 to remain in the conducting condition. Thus it can be seen that the AND circuit 1 once operated, will cause the circuit to be latched on the ON condition. In order to unlatch the circuit, it is necessary to pass a signal through one of the AND circuits 5 or 6 so as to operate the OR invert circuit 8 and generate a negative signal at the output thereof.

In operation, AND circuits 1 and 6 are gated in response to a plus set A signal and a plus clock signal appearing concurrently. If this concurrency occurs, then either the AND circuit 1 or the AND circuit 6 will operate, depending upon whether there is or is not a plus bit A signal also present. If there is a plus bit A signal, the AND circuit 1 will operate causing the latch to be set thereby to indicate a ONE by means of a plus bit X signal. If the plus bit A signal is not present, then the inverter 9 will cause the AND circuit 6 to operate so that the circuit of FIG. 1 will be in the reset, or OFF condition, and all of the output polarities will be in the state opposite to those as shown. This indicates a bit zero in this particular stage.

In FIG. 2, a simplified representation of the circuit of FIG.1 is shown, this representation merely assumes that a bistable device can be either set or reset in dependence upon the presence or adsence, respectievly, of a seletced pair of conditions.

Referring to FIG. 1, in can be seen that, any time the last condition arrives at the input to the AND circuits 1 and 6, a plus or minus setting will be reflected directly at the output of one of the OR invert circuits 4 or 8, in not more than two levels of logic. This is due to the fact that the AND circuits 1, 3, 5 and 6 comprise diodes which are connected so as to perform the AND function at the input of a transistor, the transistor circuit providing the OR invert function.

While the invention has been shown and described with respect to a particular embodiment thereof, it should be apparent to those skilled in the art that various changes, particularly in the number of inputs applied to any particular OR invert circuit, could be made therein without departing from the spirit and scope of the invention.

What is claimed is:

1. A two-level delay register stage comprising:
sources of clocking signals, information signals and information setting signals;
a first logical circuit having a plurality of inputs and and an output;
a second logical circuit having a plurality of inputs and an output;
means for cross-connecting a first one of the inputs of each of said logical circuits and the output of the other of said logical circuits;
means for connecting said clocking signal source to a second input of each of said logical circuits;
means for connecting said information setting signal source to a third input of each of said logical circuits; and
means for connecting said information signal source to a fourth input of the first logical circuit and the inverse of the information signal from said source to a fourth input of the second logical circuit.

2. The invention of claim 1, wherein:

said first and second logical circuits each comprise AND circuits and OR circuits.

3. The invention of claim 2, wherein:

the AND circuits have inputs which comprise the inputs to the first and second logical circuits;

the OR circuits have outputs which comprise the outputs from the first and second logical circuits; and the OR circuits have inputs connected to outputs from corresponding AND circuits.

No references cited.

JOHN S. HEYMAN, *Primary Examiner*.

ARTHUR GAUSS, *Examiner*.

S. D. MILLER, *Assistant Examiner*.